Oct. 23, 1934. W. R. CUTHBERT Re. 19,346

CLIP FOR WRITING INSTRUMENTS

Original Filed July 22, 1929

Inventor:
WILLIAM R. CUTHBERT
By Jones, Addington, Amos & Seibold:
Attys.

Witness:
David S. Snagnusson.

Reissued Oct. 23, 1934 Re. 19,346

UNITED STATES PATENT OFFICE 19,346

CLIP FOR WRITING INSTRUMENTS

William R. Cuthbert, Fort Madison, Iowa, assignor to W. A. Sheaffer Pen Co., Fort Madison, Iowa, a corporation of Delaware Original No. 1,794,154, dated February 24, 1931, Serial No. 379,958, July 22, 1929. Application for reissue February 20, 1933, Serial No. 657,658

7 Claims. (Cl. 24—11)

This invention relates to a clip construction for writing instruments and has special reference to means for securing the clips to casings of lead pencils or caps of fountain pens for retaining the pencils or fountain pens in a pocket.

More particularly, this invention relates to a pocket clip for pencils or fountain pens comprising a body portion having one end ball-shaped and a pair of ears at the other end and on opposite sides of the body portion for gripping the material between two slotted portions of the writing instrument, the body portion being of a resilient material and bent so as to urge the ball-shaped end into engagement with the body portion of the barrel of the pencil or cap of the fountain pen.

The present invention obviates the necessity of securing the clip to the casing with the use of solder, screws, rivets or the like and presents a smooth and unobstructed inner surface in the casing whereby the inner mechanisms, such as the lead propelling mechanism of the mechanical pencil or the rubber insert for sealing the ink feeding mechanism of the pen, encounter no interference within the casing.

Pencils and fountain pens of present construction are generally formed of compositions such as are known to the trade as Radite, bakelite and the like. The trend is toward thin models of writing instruments and in order that the construction be durable at the same time, either the composition should be of comparatively great thickness or should be reenforced if comparatively thin. In the accompanying drawing both forms are shown, that is, an ordinary writing instrument formed entirely of composition and a slender tapered model writing instrument formed of a combination composition shell and reenforcing shell.

One of the objects of this invention is to provide a clip construction for a slender model writing instrument, the casing of which latter is formed of a shell of a composition material superposed on a shell of metal whereby the casing of itself is suitably reenforced to secure the clip against displacement.

Another object of this invention is to provide a clip construction which is durable, is easily assembled and comparatively inexpensive to manufacture.

A further object of this invention is to provide a clip construction for an ordinary type writing instrument, the casing of which is formed entirely of a composition material wherein a separate reenforcing member is provided in connection with the material of the casing to secure the clip against displacement.

Other objects and advantages will hereinafter be more particularly pointed out and for a better understanding of the nature, scope and characteristics of this invention reference may now be had to the accompanying drawing and the following description, in which latter:

Figure 1:
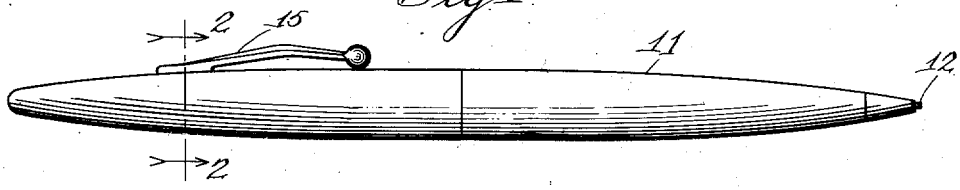
Figure 1 is a side elevation view of a lead pencil having a composition casing and an inner metallic shell with the clip secured thereto in accordance with the teaching of this invention.
Figure 2:
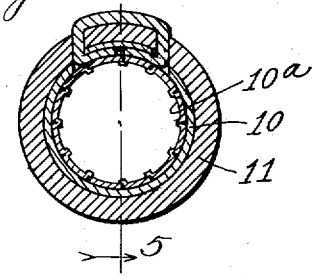
Fig. 2 is a transverse sectional view taken on the line 2—2 of Figure 1.
Figure 3:
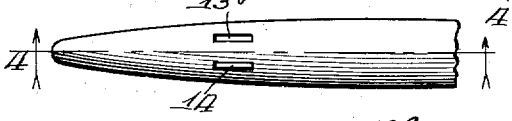
Fig. 3 is a top plan view of a portion of the pencil before the clip is inserted showing the openings through the walls of the shell casings for receiving the ears of the clip.
Figure 4:
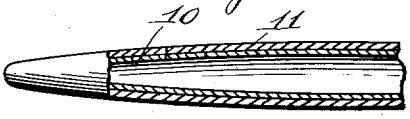
Fig. 4 is a side view of Fig. 3 partially in section and taken on the line 4—4 thereof.
Figure 5:
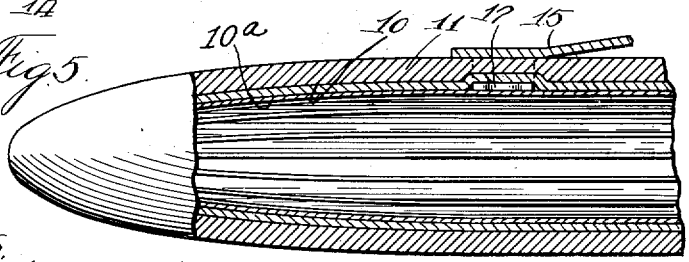
Fig. 5 is a view similar to Fig. 4 showing the clip in an assembled relation therewith.
Figure 6:
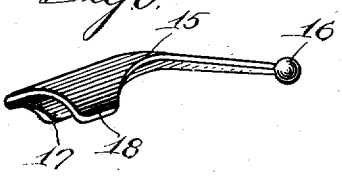
Fig. 6 is a detailed perspective view of the clip showing the ears thereon for engaging the shells of the casing in an initial position prior to assembly therewith.

Referring now to the drawing and more particularly to Figures 1 to 6 inclusive thereof, a lead pencil of the mechanical type is shown comprising an inner ductile metallic shell 10 having an outer composition shell 11 superposed thereon to form the pencil casing. The casing is adapted to receive therein a rotatable pencil lead moving mechanism of any of the well-known types, the casing being tapered or conically shaped at both of its ends and having the usual axial bore therethrough for the reciprocal movement therein of a pencil lead 12. The casing is of two parts, the upper portion or the end opposite to that of the writing point comprising the usual rotatable operating member for the lead moving mechanism.

The casing, consisting of the outer and inner shell members 10 and 11, is provided with two preferably elongated and substantially parallel openings 13 and 14 on the operating member of the two-part casing adjacent the closed tapering end thereof. These openings or slots may be stamped or otherwise formed from the materials of the casing, they preferably being provided therein by means of a rotary cutter.

The lead moving mechanism is anchored in the lower or writing end portion of the two-part casing and has a portion extending outwardly therefrom for engagement in a sleeve 10ᵃ anchored in the upper end portion of the casing. The sleeve 10*a* is provided with longitudinally extending ridges spaced peripherally thereof for engaging registering ridges on the outer wall of the tube or outwardly extending operating portion of the lower casing. The sleeve 10ᵃ is not an essential feature of the present invention and is shown merely for the purpose of disclosing more clearly the unobstructed inner surface whereby the lead propelling mechanism encounters no interference within the casing for operation.

The clip which together with the aforedescribed casing form the clip construction, comprises a body portion 15 having one end thereof formed into a ball-shape 16. The material of the body portion is preferably formed of resilient material and of arcuate shape in order to grip the material of the pocket tightly between the ball 16 and the body portion of the pencil or the cap of the fountain pen. Ears 17 and 18 are formed from the material of the body portion on opposite sides thereof and are of a thickness less than that of the body portion. The ears extend longitudinally of the body portion and are bent substantially at right angles thereto in the initial condition thereof. The ears 17 and 18 are adapted to be inserted through the openings 13 and 14, respectively, in the casing and are bent toward each other to contact with and to cover the underside of the material between the slots with their projecting edges substantially meeting. By reason of the ears being relatively thin, a minimum of space is occupied within the casing yet providing for a sufficient strength of the material of the body portion which is thickened relatively thereto. In clamping the ears 17 and 18 over the material of the casing the material of the metal shell 10 between the slots is urged toward the body portion 15 of the clip to form a raised longitudinally extending strip and the material of the composition shell 11 is preferably compressed therebetween in order that the inner surface of the casing be preserved in a smooth, unobstructed state, the bottom surfaces of the projecting edges of the ears 17 and 18 extending flush with the periphery of the circular bore of the shell 10.

It will be noted that in order to provide a neat appearing pencil or other writing instrument, the slots or openings 13 and 14 must be comparatively close together in order that a clip of a medium size or of the proper proportion to the length and width of the pencil may be employed. By reason of the openings 13 and 14 being thus close together the material of the composition between the openings in and of itself would hardly suffice to retain the clip thereon, even though the writing instrument be not misused. Therefore, the inner shell 10 being of metal acts as a reenforcement for the composition shell generally and provides an efficient gripping means for retaining the clip against displacement specifically.

In providing the present construction there are but two operations necessary, one in which the apertures 13 and 14 are formed either by means of a rotary cutting instrument or a punch, and the second in which the ears are bent toward each other and toward the body portion 15 of the clip to compress the material of the composition shell 11 and to raise the material between the apertures of the metal shell 10.

Figure 7:
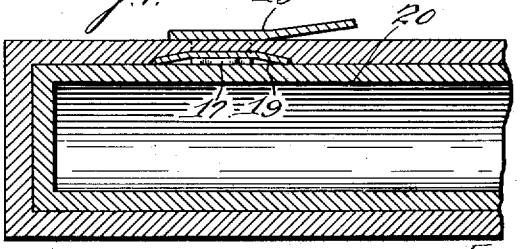
Fig. 7 is a central sectional view of a modified form of clip assembly.

Referring now more particularly to Fig. 7, the construction shown is that of a cap formed of composition, the thickness of the composition being substantially greater than the thickness of the composition material in the previously described embodiment for the reason that there is no reenforcing metallic shell in the former. However, inasmuch as there is no metallic shell to provide such a reenforcement, a strip of metallic material 19, of substantial length to extend longitudinally beyond the ears 17 and 18 on each side thereof, is disposed between the ears as the latter are inserted through the openings 13 and 14, whereafter the ears are bent inwardly toward each other in the manner previously described with reference to the prior embodiment whereby the composition material is preferably compressed between the body portion 15 of the clip and the ears 17 and 18 thereof and the reenforcing strip 19 is raised to seat itself within the composition material allowing sufficient room for the ears to clear the inner bore of the cap. Therefore, the sealing member 20 for the ink feeding mechanism may be inserted into the cap without interference. It is to be noted that should the ears 17 and 18 and/or the reenforcing strip 19 not clear the inner bore of the cap but extend thereinto substantially, the sealing member 20 would of necessity be cut away in a manner to permit clearance of this obstruction. This, of course, would be greatly objectionable.

As a result of this invention a means has been provided for securing clips to casings of various types for writing instruments, the casings being of a composition material wherein that material is suitably reenforced to provide a substantial support for the clip. The construction also provides for a minimum number of operations in assembling the construction, which, of course, reduces the cost of construction and naturally provides a more efficent and durable construction, there being less chance of crystallzation of the material. The clip is secured to the writing instrument without the use of solder, screws, rivets or the like and thus preserves a smooth and unobstructed inner surface of the casing whereby the sealing member for fountain pens or the lead propelling, repelling or expelling mechanism avoids interference in the casing.

While but two forms of this invention are herein shown and described, it is to be understood that various modifications may be apparent to those skilled in the art without departing from the spirit and scope of this invention and, therefore, the same is to be limited only by the scope of the prior art and the appended claims.

I claim:

1. A clip construction for writing instruments comprising a casing formed of a composition shell superposed on a metallic shell, said shells having aligned spaced slots therein, an elongated clip having ears formed thereon extending through the spaced slots in said shells, the material of said shells between said slots being displaced and said ears being formed to extend over the underside of the displaced material between said slots outside of the contour of the inner bore of said casing.

2. A clip construction for writing instruments comprising a casing including a shell formed of composition material having spaced slots therethrough and the material of said shell between said slots being displaced, an elongated clip having ears formed thereon and passing through said slots, a reenforcing strip between said ears for engaging the inner displaced wall of said composition shell, said ears being formed to extend over the underside of said strip outside of the contour of the inner bore of said casing.

3. A clip construction for writing instruments comprising a casing formed of a composition shell superposed on a metallic shell, said shells having aligned spaced slots therein, an elongated clip having ears formed on opposite sides and extending longitudinally thereof for passing through the spaced slots in said shells, said ears being formed to extend over the underside of the material between said slots, the material of said composition shell between said slots being compressed and the material of said metallic shell between said slots forming a raised strip to allow clearance between the lower surface of said ears and the inner bore of said casing.

4. A clip construction for writing instruments comprising a casing including a shell formed of a composition material having spaced slots therethrough, an elongated clip having ears formed on opposite sides and extending longitudinally thereof for passing through the spaced slots in said casing, a reenforcing strip between said ears for engaging the inner wall of said composition shell, said ears being formed to extend over the underside of said strip, the composition material between said slots being compressed and said strip being raised to allow clearance between the lower surface of said ears and the inner bore of said casing.

5. A clip construction for writing instruments comprising a casing including a shell formed of a composition material having spaced slots therethrough, an elongated clip having ears formed on opposite sides and extending longitudinally thereof for passing through the spaced slots in said casing, a metal strip between said ears for engaging the inner wall of said composition shell, said ears being formed to extend over the underside of said strip, the composition material between said slots being compressed and said strip being raised to allow clearance between the lower surface of said ears and the inner bore of said casing.

6. A clip construction for writing instruments comprising a casing including a shell formed of composition material having spaced slots therethrough, the material of said shell between said slots being displaced, an elongated clip having ears formed thereon and passing through said slots, said ears being of a thickness less than that of said clip, a reenforcing strip between said ears for engaging the inner displaced wall of said composition shell, said ears being formed to extend over the underside of said strip outside of the inner bore of said casing.

7. A clip construction for writing instruments comprising a casing formed of a composition shell superposed on a metallic shell, said shells having aligned spaced slots therein, an elongated clip having ears formed thereon extending through the spaced slots in said shells, the material of said shells between said slots being displaced and said ears being formed to extend over the underside of the displaced material between said slots outside of the contour of the inner bore of said casing and being of a thickness less than that of said clip.

WILLIAM R. CUTHBERT.